(No Model.) 3 Sheets—Sheet 1.

F. S. CULVER.
ELECTRIC RAILWAY.

No. 450,613. Patented Apr. 21, 1891.

WITNESSES:
Frank S. Orr
Thomas K. Trenchard

INVENTOR
Frank S. Culver.
BY
Johnston
ATTORNEY.

(No Model.) 3 Sheets—Sheet 2.
F. S. CULVER.
ELECTRIC RAILWAY.
No. 450,613. Patented Apr. 21, 1891.
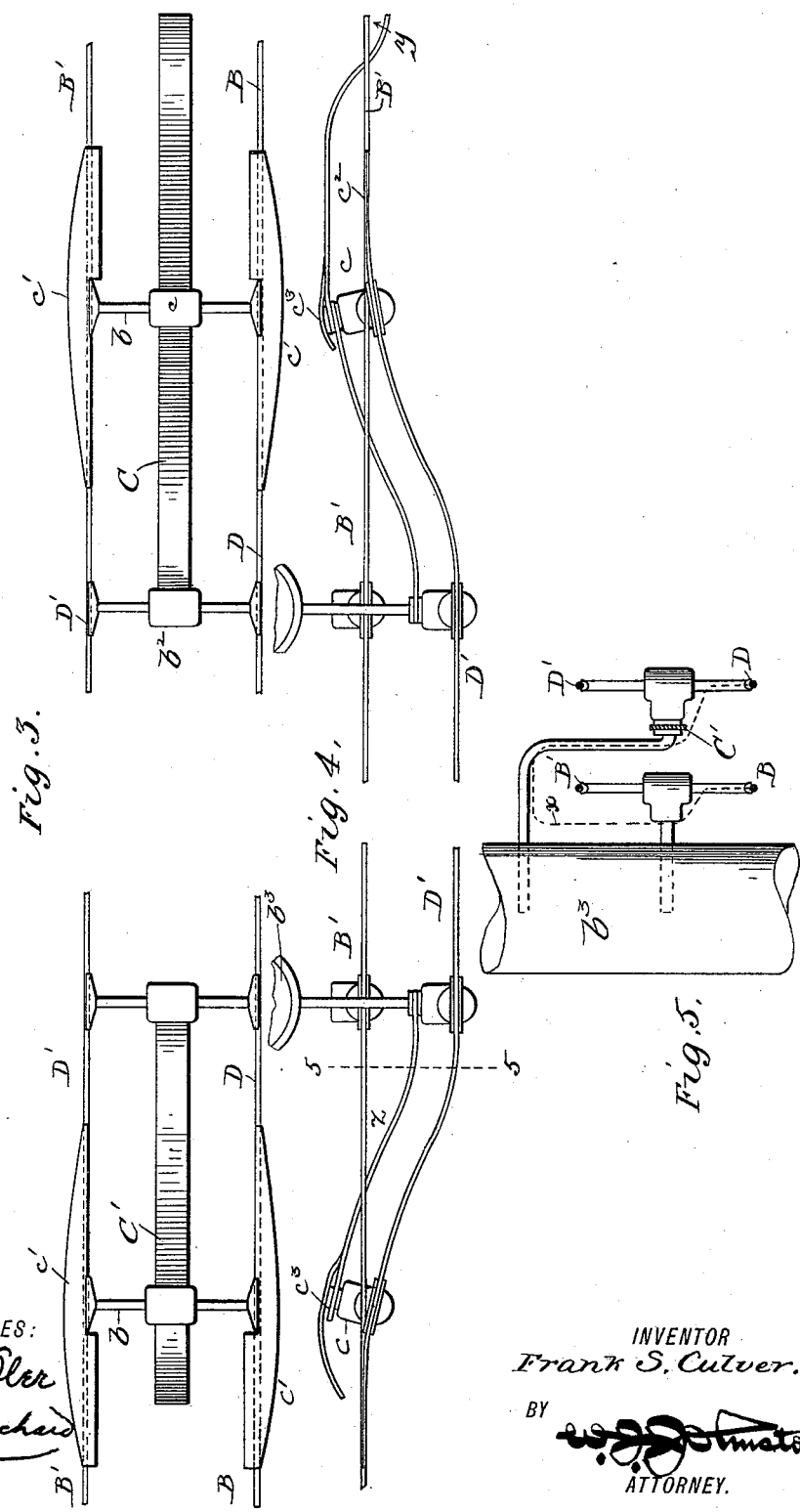
WITNESSES:
INVENTOR
Frank S. Culver.
BY
ATTORNEY.

(No Model.)  3 Sheets—Sheet 3.

F. S. CULVER.
ELECTRIC RAILWAY.

No. 450,613. Patented Apr. 21, 1891.

WITNESSES:
Frank S. Ober
Thomas K. Trenchard.

INVENTOR
Frank S. Culver.
BY
ATTORNEY.

United States Patent Office.

FRANK STERLING CULVER, OF EAU CLAIRE, WISCONSIN.

ELECTRIC RAILWAY.

SPECIFICATION forming part of Letters Patent No. 450,613, dated April 21, 1891.

Application filed September 25, 1890. Serial No. 366,078. (No model.)

*To all whom it may concern:*

Be it known that I, FRANK S. CULVER, a citizen of the United States, residing in Eau Claire, in the county of Eau Claire and State of Wisconsin, have invented certain new and useful Improvements in Electric Railways, of which the following is a specification.

My invention relates to improvements in systems of electric railways, and particularly refers to the collecting devices or trolleys for taking the current from a wire and to switches and crossings in the conducting-wires themselves, the said switches and crossings being especially designed for the passage of the said trolleys.

The first object of my invention is to produce a light and easy-running two or four wheel trolley adapted to yieldingly engage both wires of a double-strung wire system, in which one of said wires is above the other; and my object is also to produce a simple and automatic switch and crossing for such system.

My invention consists in the construction and combination of parts, as hereinafter described and claimed.

Figure 1:
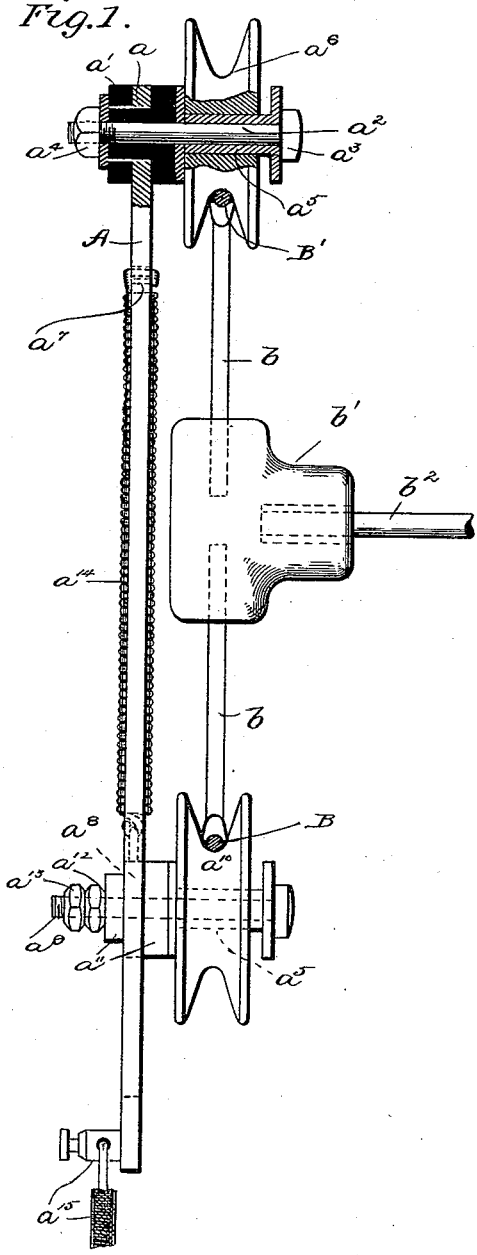
Figure 2:
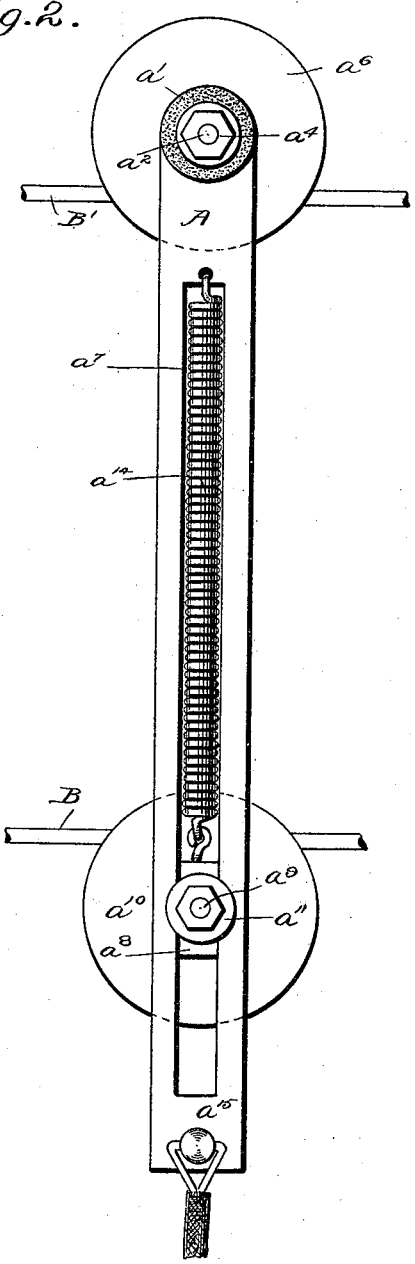
Figure 6:
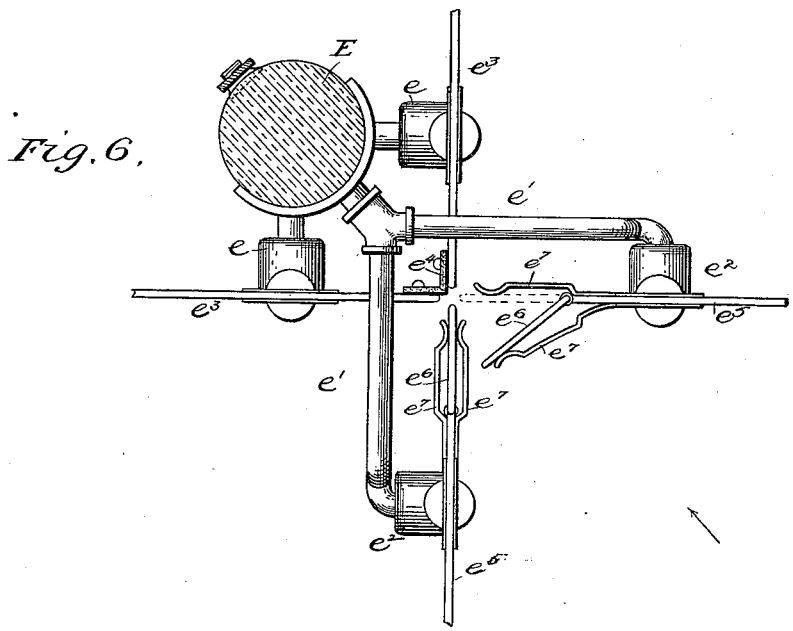
Figure 7:
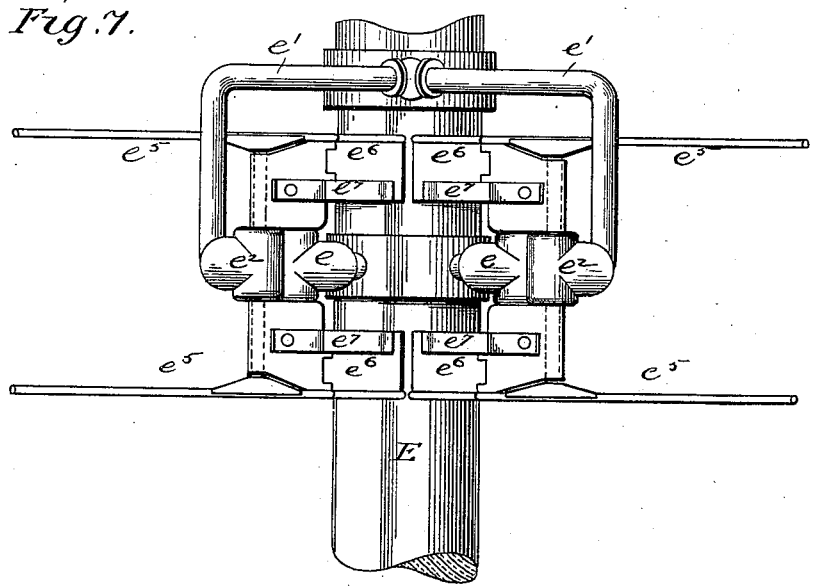

In the accompanying drawings, Figure 1 is a front elevation of the trolley in position on the upper and lower wires (shown in section) of the combined trolley track and conductor, the trolley-wheels and their bearings being shown in section. Fig. 2 is a side elevation of the trolley. Fig. 3 is a side elevation, and Fig. 4 a plan, of my improved switch or turnout. Fig. 5 is a cross-section on the line 5 5 of Fig. 4. Fig. 6 is a plan of my improved crossing; and Fig. 7 is a side elevation of the same, looking from the point and in the direction of the arrow 7 in Fig. 6.

Similar reference-letters in the several views indicate the same or similar parts.

The trolley illustrated has two wheels, one at each end of a bar, but of course more wheels might be employed. The bar A is bored at its upper end to receive the sleeve $a$ of the two-part insulator-spool $a'$, and which sleeve receives the shank of a bolt $a^2$, having a head $a^3$ at one end and washer and nut $a^4$ at the other end. Between the side of the insulator-spool and the bolt-head is confined a metallic two-part spool $a^5$, the sleeve of which between the heads is longer than the hub of the wheel $a^6$, for which it forms the bearing, and which is allowed some lateral play thereon to avoid binding. In the space between one side of the wheel and the adjoining metal spool-head a spring may in some instances be placed in order that as the trolley operates the switch, as hereinafter described, the contact of the two may be more yielding.

Running nearly the entire length of the bar A is a slot $a^7$, in which slides the block $a^8$, carrying the shank of a bolt $a^9$, similar to bolt $a^2$, and carrying also a two-part metal spool $a^5$, on which the lower wheel $a^{10}$ rotates, and is free to have slight lateral play. The bolt $a^9$, instead of being insulated from the bar, is electrically connected therewith, since no insulating material is placed between them. Instead thereof the shank of the bolt closely fits a hole in the sliding block $a^8$, and washers $a^{11}$ are placed each side of the block and overlap the sides of the slot in the bar. A nut $a^{12}$ and check-nut $a^{13}$ serve to unite and confine the parts. A coil-spring $a^{14}$ is contained within the slot $a^7$, has its upper end secured in the bar and its lower end to the block $a^8$, and serves to draw the two wheels toward each other and insure a constant engagement of said wheels with the upper and lower wires. A further and more important function of this yielding connection of the wheels with respect to each other is that of permitting the said wheels to spread apart in passing the switches presently described.

At $a^{15}$ is shown the connection of a flexible conductor for carrying the current to the car.

With the construction and connections as shown in the drawings only the lower wire B is for a current, and the upper wire B' serves only as a guard-wire; but it is obvious that by connecting the negative of the car-motor with the upper wheel $a^6$ or its bolt, the upper wire might be used for the return current.

Hereinafter I refer to the upper wire B' as the "guard-wire" and the lower wire B as the "conductor or trolley wire." These two wires are supported at intervals by arms $b$, projecting down and up, respectively, from insulating-blocks $b'$, which are in turn supported by horizontal or bracket arms $b^2$, extending out to any suitable distance from posts or other supports $b^3$. The upper wire, whether employed as an electric conductor or not, serves to keep the trolley securely on its track and guards against its displacement, while the spring $a^{14}$, in connection with the movable or sliding bearings of one of the wheels, insures freedom of motion of the trolley without risk of its becoming dislodged. In this construction it is necessary to provide the wheels with deep grooves or flanges of considerably enlarged diameter, and hence in order to switch such trolley from one track to another it becomes necessary to especially provide therefor, and I will now proceed to describe my improvements in this respect.

In Figs. 3 and 4, which represent a turn-out switch for a single-track railway having street-track turn-outs and in which figures much of the line between the ends of the turn-out is omitted, the construction is such that the trolley of a car moving to the left will pass over the main or straight wires, while that of a car moving to the right will pass over the outwardly-curved sections or side tracks; but it will be understood that the same or substantially the same construction of switch could be employed in other locations than at a turn-out—as, for instance, a branch track to a different street.

Fig. 5 shows in elevation the post and bracket arms shown in plan in Fig. 4 and the method of leading the connection-wires $x$, so that no interference will be encountered by a trolley running on either track. Looking first at the right-hand portions of Figs. 3 and 4, it will be seen that a spring C is secured to the bracket-arm $b^2$ and extends to the right between the upper and lower wires, passes beyond their vertical plane, and then returns again between the wires. About midway of the length of this spring is secured an insulating-block $c$, having upwardly and downwardly extending arms, which carry fins $c'$, that consist of double-inclined planes reaching above and below the horizontal planes of the upper and lower wires, respectively, and which, preferably, when in the position shown in the drawings, at one end fit slight depressions $c^2$ in the side of the main wires B and B', while toward the other end the said fins curve outwardly and form the ends of the side-track wires D and D'. At the point where the insulating-block $c$ is bolted to the spring C a shield $c^3$ is riveted to the spring and extends over the bolt-heads, in order that a trolley-bar will not catch on them in operation. At the other end of the side track is a spring C' and fins $c'$ similar to those just above described; but at this end there is no necessity of the end of the spring returning or extending as far as the spring C. Both of the springs have a tendency to keep the fins with their ends in engagement with the sides of the main wires.

In operation, a trolley advancing from the right to the left, its bar enters the space indicated at $y$ between the main wires and the end of the spring and forces the spring away or outward, so as to remove the fins $c'$ from proximity to the main wires, and after the trolley has passed the spring the latter returns the fins to their position, as shown in the drawings. The trolley continuing enters the space at $z$, between the main wires and the spring C', crowds the latter aside, thus removing the fins at this end also from proximity to the main wires and allowing the trolley to pass, after which the fins return to their normal position. When a trolley passing from the left to right reaches the fins, the wheels of the trolley are spread apart far enough, so that their flanges will not engage the main wires as the wheels follow the curves of the fins off to the right and onto the side track. As the trolley leaves the side track, the fins carried by spring C again spread the trolley-wheels and conduct them onto the main wire. The slot-and-spring construction of the trolley allows the wheels to spread for this purpose. The bracket-arms $d$ extend from the post, as shown in Fig. 5, above the plane of the upper wire of the main track, and then downward and outward to support the side-track wires.

To provide a crossing for two independent lines of railways which employ this system of wires and trolleys, I have invented and produced the construction now described. To a post E two short brackets $e$ are secured at right angles to each other, and above them at a distance sufficiently high to allow a trolley to pass underneath two longer brackets $e'$ are secured. In Fig. 6 these two long brackets are shown as carried by one bifurcated casting at the post, but it is obvious that the brackets may be differently arranged or mounted, or that the insulating-blocks $e^2$, shown at the ends of the four brackets may be differently supported. To the insulating-blocks of the short brackets are secured the sections $e^3$ $e^3$ of trolley and guard wire, which are separated from each other at the angle and preferably braced by an angle-piece $e^4$ of insulating material, and to the insulating-blocks of the long brackets are secured the sections $e^5$ $e^5$ of trolley and guard wire. These four sections, as shown, are for a crossing at right angles; but they may be arranged at different angles. As shown, there are but four converging sections, but if more than two lines were to cross at one point six or more converging sections might be employed. To the end of each section $e^5$ are hinged wings $e^6$, as extensions thereof, and each side of each wing a leaf-spring $e^7$ is held to keep it normally in alignment with its respective section $e^5$ beyond the angle.

In operation a trolley on one line, passing, of course, with its vertical bar on the side of the wires opposite the brackets, simply swings to one side the wing which projects across its path, and after passing the leaf-spring, which has been forced back, returns the wing to its proper position to support a trolley, which may be drawn along the crossing-line. In Fig. 6 one wing is shown in heavy lines as in the position to which it would be swung by a trolley passing from the farther end of the line (shown as vertical in said figure) to the nearer end, and the dotted lines indicate the normal position of said wing, to which it would return after the passage of the trolley. By the arrangement of the spring $a^{14}$ within the slot $a^7$ of bar A the said bar will readily operate the movable parts of the switches and crossings without danger of the spring interfering with or catching upon said movable parts.

Having thus described my invention, I claim—

1. An electric-railway trolley consisting of a slotted bar, a wheel at one end of the bar and another wheel having its axle movable along said bar, and a spring within said slot and connected to the bar at one end and at the other end to the movable wheel, substantially as described.

2. The combination, with a trolley having a bar and wheels movable toward each other, of guard and conductor wires engaged by said wheels, and a switch in said wires having a projecting arm or lever adapted to be engaged by the bar of the trolley for operating the switch, substantially as described.

3. The combination, with a trolley having a bar and wheels movable toward each other, of guard and conductor wires engaged by said wheels and crossing lines of said wires, said crossing lines having laterally-movable sections adapted to be engaged by the bar of the trolley and moved aside thereby, substantially as described.

4. In an electric-railway switch, the combination, with the main line and side or branch line, of a spring-pressed switch-section normally connecting the two lines and of greater width than the main line, and having a projection adapted to be engaged by a passing trolley to disconnect said switch from its normal position.

5. The combination, with the main and branch wires, of the switch-spring C, carrying fins $c'$ for connecting the two lines, said fins consisting of double inclined planes projecting above and below the main line, substantially as described.

6. The combination, with the main and branch lines, of the switch-spring C, having fins $c'$ bolted to it, and the shield $c^3$, overlapping the ends of the bolts, substantially as described.

7. A crossing for independent lines of trolley-tracks, consisting of four converging sections, the approaching ends of two of the sections at an angle to each other being hinged, substantially as described.

8. In a crossing for independent lines of trolley-tracks, the combination, with the sections $e^3$, of the insulating angle-piece $e^4$, connecting the ends of said sections, substantially as described.

9. In a crossing for independent lines of trolley-track, the combination, with the sections $e^3$ and the sections $e^5$, of the wings $e^6$, hinged thereto, and springs for normally holding the wings in alignment with the sections $e^3$, substantially as described.

In witness whereof I have signed my name in the presence of two subscribing witnesses.

FRANK STERLING CULVER.

Witnesses:
  TERENCE DEVITT,
  W. R. CHAPPELL.